Dec. 1, 1936.  B. D. WOOLLEY  2,062,774
POWER ACTUATED STEERING MECHANISM
Original Filed April 7, 1934
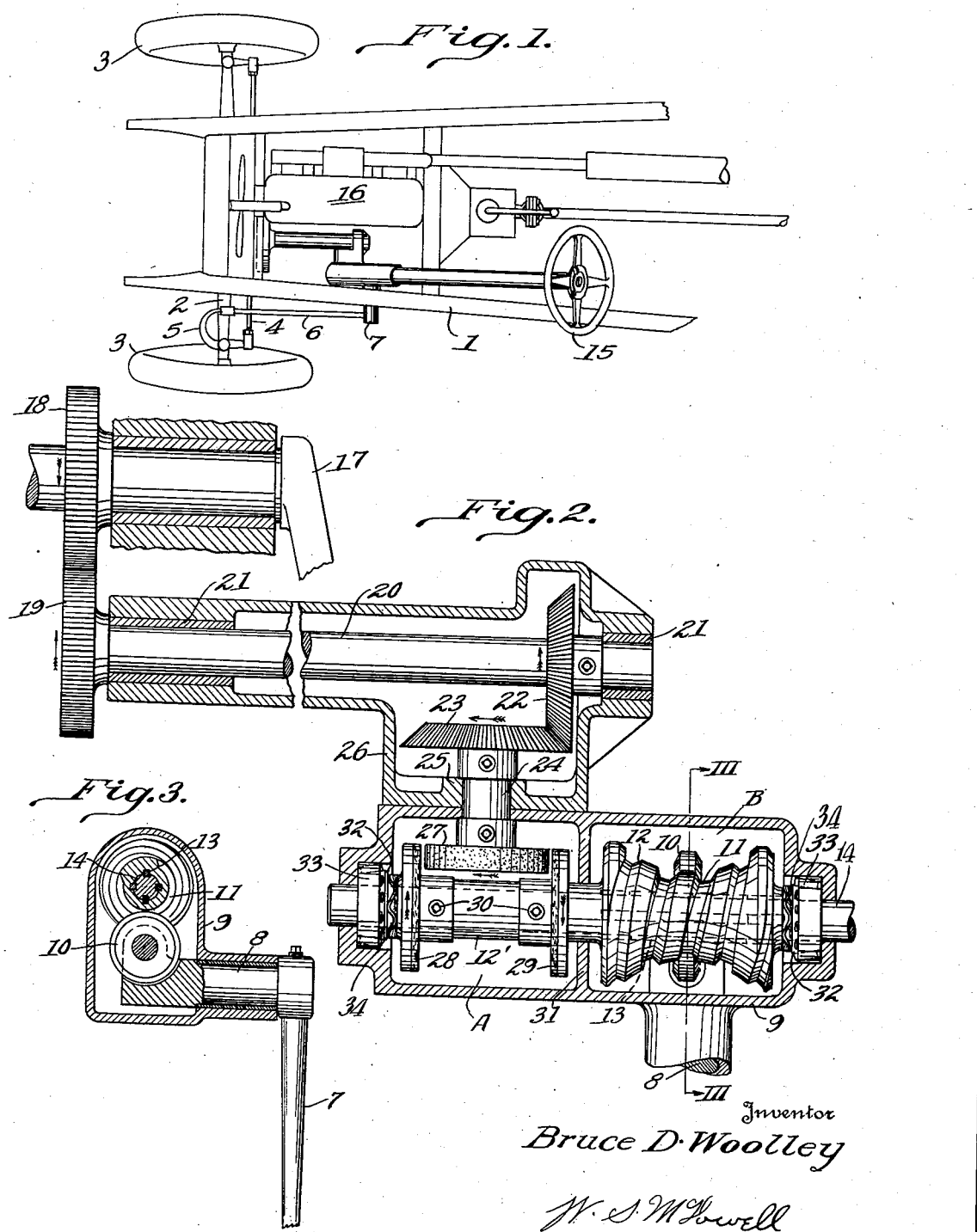
Inventor
Bruce D. Woolley Patented Dec. 1, 1936

2,062,774

UNITED STATES PATENT OFFICE 2,062,774

POWER ACTUATED STEERING MECHANISM

Bruce D. Woolley, Johnstown, Ohio

Application April 7, 1934, Serial No. 719,537
Renewed April 27, 1936

5 Claims. (Cl. 180—79.3)

This invention relates to improvements in engine driven means for facilitating the turning or operation of steering gear mechanism used in connection with automotive vehicles. With the use of modern balloon or other low pressure types of tires, it is a matter of very considerable difficulty to execute manually the turning of the steering wheels of a motor vehicle, particularly when such a vehicle is not in motion or to effect the execution of the sharp and quick manipulations of the steering gear during the parking of the vehicle, or in the manipulations to remove the vehicle from a line of stationary vehicles arranged adjacent to street curbing, or in other similar capacities wherein prompt and quick turning of the steering wheels in limited areas is required.

It is therefore an important object of the present invention to provide a simple yet efficient means driven from the crank shaft of the engine of a motor vehicle and operated automatically by the turning movement of the steering wheel shaft and its associated worm gear, to apply the power of the engine to the steering gear shaft so that the latter may be rotated with the aid of the engine but in such a manner as to be always under the control of the vehicle operator.

It is a further object of the invention to provide the lower portion of the steering gear shaft with a pair of spaced friction drive wheels, which are normally spaced from a similar drive wheel disposed at right angles to the first-named wheels and driven by engine power, and wherein use is made of the longitudinal thrust of the worm gear for controlling the engagement between said wheels so that when a pair of the latter are in frictional contact, the power of the engine will be employed for facilitating the rotation of the steering gear shaft.

For a further understanding of the invention, reference is to be had to the following description and the accompanying drawing, wherein:

Fig. 1 is a plan view of the forward portion of the chassis of a motor vehicle, the latter being equipped with the improved steering gear operated mechanism constituting the present invention;

Fig. 2 is a horizontal sectional view taken through the steering gear mechanism and disclosing the engine driven power transmitting mechanism for facilitating the rotation of the steering gear shaft;

Fig. 3 is a vertical transverse sectional view on the plane disclosed by the line III—III of Fig. 2.

Referring more particularly to the drawing, the numeral 1 designates the frame of a motor vehicle. This frame at its forward end is provided with the usual front axle 2 upon the ends of which are mounted the forward steering wheels 3. The wheels 3 are united by the usual cross link 4, and one of the supporting knuckles of the steering wheels is formed with a curve rearwardly extending crank arm 5, which, as usual, is connected with a drag link 6, which has its rear end connected with the depending portion of a crank 7 carried in connection with the outer end of a shaft 8. The inner end of the shaft 8 is arranged, as usual, within a housing 9 and is provided with a roller 10 disposed for engagement with the helical grooves 11 provided in a substantially spool shaped worm gear 12.

The worm gear 12 is keyed or otherwise secured for limited longitudinal movement as at 13 to the lower end of the steering gear shaft or post 14, the upper end of said shaft being equipped with the customary manually operated wheel 15 disposed adjacent to the operator's position of the vehicle. It will be seen that by rotating the shaft 14 and the worm gear 12 keyed thereto, oscillating motion will be imparted to the roller 10 and its associated shaft 8, thereby rocking the crank 7 and imparting movement to the steering wheels 3.

To this conventional type of steering gear, I have provided an improved means for facilitating its operation by using power derived from the engine 16 of the vehicle. In the specific embodiment of the invention illustrated, the crank shaft 17, or other corresponding rotatable shaft of the engine, is provided with a gear 18, meshing with a similar gear 19 fixed upon one end of a journalled shaft 20 extending parallel with the engine and supported for rotation in the bearings 21. The shaft 20, at the end thereof opposite to the gear 19, is provided with a bevel gear 22, which meshes with a similar gear 23 fixed upon one end of a short transversely extending shaft 24, the latter being journaled in bearings 25 carried in connection with a gear casing 26.

Fixed to the outer end of the shaft 24 is a plain friction type drive wheel 27 formed from fiber or having its outer surface faced with leather. The wheel 27 is confined for rotation within a compartment A of the housing 9 and is normally spaced from a pair of similar friction drive wheels 28 and 29 fixed as at 30 to the lower end of a sleeve 12' formed with the worm gear 12. The housing 9 is further provided with a compartment B separated from the compartment A by the wall 31. In the compartment B, the worm gear 12 and the roller 10 are positioned. By the provision of the two compartments, the gear 12 may be lubricated with customary lubricants and the lubricants confined to the compartment B in order to avoid their interference with the proper functioning of the wheels 27, 28 and 29.

The lower end of the steering post 14 is provided at the opposite ends of the housing 9 with the inner races 32 forming a part of roller thrust bearings 33, the outer races of said bearings being carried by the housing 9. Surrounding the post 14 and confined between the ends of the worm and its sleeve and the inner races 32 of the post bearings are corrugated spring members 34 which are adapted to yield slightly whenever the steering post is turned in response to the thrust action of the worm gear 12.

Thus in operation, whenever the steering shaft 14 is turned to the left or the right, the longitudinal thrust of the worm gear 12 brings the friction drive wheels together to impart power to the steering post, thus rendering the operation of steering the motor vehicle or in otherwise manipulating the same practically devoid of physical effort and very simple and easy to execute.

This ease of operation is attained primarily by mounting the sleeve 12' on the lower end of the steering post 14 so that the sleeve will be rotatable in unison with said post, free to slide longitudinally thereof to a limited extent, this extent of sliding movement being governed by the spring washers 34. The longitudinal movement of the sleeve 12' on the lower end of the steering post is obtained by virtue of the fact that the worm gear 11 is also fixed on said sleeve for rotation in unison with the steering post. Also fixed on the sleeve 12' are the friction gears 28 and 29 which are positioned for engagement with the single driven gear 27. By this construction, when the steering post is initially manually rotated before the worm gear 11 engages with the periphery of the wheel 10 to rock the shaft 8, longitudinal thrust will be imparted to the worm gear to cause the movement of the sleeve 12' one way or the other longitudinally of the steering post 14, thus automatically bringing one or the other of the gears 28 or 29 into driving relationship with the engine driven gear 27 in order to apply engine power to effect the operation of the vehicle steering mechanism. In the event the engine driven gear 27 is idle and the motor is not running, the steering gear may be actuated manually in the conventional way.

What is claimed is:

1. In a motor vehicle, in combination, a steering post, bearings in which said post is mounted for rotatable movement, said bearings being formed to provide for limited longitudinal movement of the post whenever the latter is rotated from a normal position, gearing connected with the post for effecting the turning movements of the associated steering wheels of the motor vehicle, a pair of spaced friction wheels mounted on said post, and a third friction wheel constantly driven by the engine of the motor vehicle and arranged between the adjoining faces of the post carried friction wheels, the said friction wheels being spaced when said post is normally positioned and arranged to be selectively engaged for facilitating the rotation of the post by power derived from said engine when said post is rotated from a normal position.

2. In a motor vehicle, the combination with the steering post thereof, of a housing in which the lower end of said post is rotatably supported, a worm gear arranged in said housing and rotatable with said post, means operable upon the rotation of said post and gear to effect change in the steering positions of the associated front ground engaging wheels of the motor vehicle, a single gear driven by the engine of the vehicle and rotatably mounted in said housing, a pair of normally idle gears arranged in said housing and fixed for rotation in unison with said worm gear, and means for automatically effecting selective engagement of said normally idle gears with said engine driven gear upon the rotation of said steering post.

3. In a motor vehicle, the combination with the steering post thereof, of a housing in which the lower end of said post is rotatably supported, a sleeve arranged within said housing for limited sliding movement on the lower end of said post and for rotation in unison with said post, a worm gear rotatable with said sleeve and disposed within said housing, steering wheel turning means operated by said worm gear, a single engine driven gear rotatably mounted within said housing, and a pair of normally idle gears fixed for rotation with said sleeve and automatically and selectively engageable with said engine driven gear by the rotation of said steering post and the thrust action of said worm gear.

4. In a motor vehicle, in combination, a manually rotatable steering post, a housing in which the lower end of said post is journalled for rotary movement, a sleeve slidably keyed to said post, a worm gear fixed upon said sleeve for rotation in unison therewith, means in engagement with said worm gear to turn the associated steering wheels of the motor vehicle, resilient washers surrounding said post and between which said sleeve is positioned, said washers providing for limited longitudinal movement of said sleeve upon the application of turning forces to said post, and means driven by the associated engine of the motor vehicle for imparting rotary movement to said sleeve following initial manual rotation of said post.

5. In a motor vehicle, in combination, a steering post, a housing provided with spaced antifriction bearings in which the lower end of said post is rotatably mounted, a sleeve slidably keyed to the lower end of said post for rotation in unison therewith, resilient washers disposed at the ends of said sleeve and cooperative with said bearings to permit of limited longitudinal movement of said sleeve on said post, gearing connected with said sleeve for effecting turning movements of associated steering wheels of the motor vehicle, a pair of spaced friction wheels mounted on said sleeve, and a third friction wheel constantly driven by the engine of the motor vehicle and arranged between the adjoining faces of the sleeve carried friction wheels, the said friction wheels being spaced when said post is normally positioned and selectively engaged with the engine driven friction wheel by end thrusts imparted to said sleeve through said gearing.

BRUCE D. WOOLLEY.